United States Patent Office 2,813,083
Patented Nov. 12, 1957

2,813,083

TEXTILE PRINTING COMPOSITIONS

Karl Craemer, Heidelberg, Germany

No Drawing. Application October 16, 1951,
Serial No. 251,647

Claims priority, application Germany October 19, 1950

10 Claims. (Cl. 260—8)

This invention relates to a new process for the production of pigmented prints, impregnations and coatings on fibrous materials.

I have found that supple, waterproof and friction-resistant pigmented prints, impregnations and coatings on fibrous materials are obtained by using as binding or coating agent an emulsion the outer phase of which consists of an aqueous dispersion of a water-insoluble polymer and a water-soluble protective colloid having reactive groups and the inner phase of which consists of an organic volatile solvent having a boiling point above 75° C. which is not soluble in water, and reacting the reactive groups of the protective colloid with a polyfunctional compound containing at least two reactive groups, if necessary by heating.

Suitable compounds of said kind which by reaction with the protective colloid produce cross-linking and consequently water-insolubility are for example compounds containing at least two ethylene-imine groups, as for example alkylene-polyethyleneimines or alkylene-imides of polybasic acids, such as the reaction products of 1 mol of ethyl oxalate or of a disulfochloride of aliphatic hydrocarbons with 2 mols of ethylene imine, or compounds which do not react until heated, such as polyisocyanates, or split off free polyisocyanates, as for example the polymers of di- or tri-valent isocyanates or isocyanates of higher valency, or the adducts of di-isocyanates to malonic acid esters, acetoacetic acid esters, bisulphites and other adducts of polyisocyanates which are at first stable to the water contained in the emulsion.

As protective colloids with reactive groups there may be used for example casein, polyvinyl alcohol, ammonium salts of partly-saponified polyacrylic acid esters, water-soluble alginates, tragacanth and partly methylated cellulose. With their aid, viscous to very viscous emulsions of water-insoluble volatile solvents, such as gasoline, benzene, xylene, toluene and trichlorethylene, can be prepared. These emulsions are worked into aqueous polymer dispersions, which may also contain pigment colours, whereby flexible pastes are formed.

All water-insoluble polymers which will yield flexible films, either alone or after the addition of softeners, are suitable for the process.

The following examples will further illustrate this invention but the invention is not restricted to these examples. The parts are by weight.

Example 1

2 parts of a reaction product of disulfochloride of aliphatic long-chained hydrocarbons containing from 8 to 18 carbon atoms with 2 mols of ethylene imine are dispersed in 36 parts of a 50% aqueous dispersion of an interpolymer from 66 parts of acrylic acid butyl ester, 12 parts of styrene and 22 parts of vinyl isobutyl ether. 62 parts of an emulsion prepared by emulsifying 72 parts of lacquer benzene having the boiling range 100° to 140° C. in 20 parts of a 12.5% ammonium caseinate solution are then worked in. A paste is obtained which is applied to a fabric web by the painting process, dried and heated for 5 minutes at 120° C. A supple, waterproof-coated material is obtained. If fillers or pigments are added, coated materials having the same properties are obtained which are weighted or coloured.

Example 2

An emulsion of pasty consistency is prepared from 10 parts of a 16% aqueous solution of a partly-saponified polyacrylic acid ethyl ester, 20 parts of water, 3 parts of ammonia (25%), 5 parts of thiodiglycol and 62 parts of heavy benzine.

3 parts of copper phthalocyanine are made into a paste with 2 parts of the reaction product of octadecyl alcohol with 25 mols of ethylene oxide and 2 parts of 25% ammonia, and 2 parts of the adduct of hexamethylene di-isocyanate and sodium bisulphite and 40 parts of a 40% aqueous dispersion of an interpolymer of 60 parts of acrylic acid butyl ester and 40 parts of vinyl chloride are added.

52 parts of the pasty heavy benzine emulsion are then stirred in. Fabric is printed with the resulting paste by the film or Rouleaux printing process. After drying, the fabric is heated for 10 minutes at 140° C. A soft textile print is obtained which is fast to washing and rubbing.

Example 3

2 parts of 2.4-toluylene-di-isocyanate-bisulfite are dissolved in 40 parts of a 50% aqueous dispersion of polyvinyl propionate which contains 4% of polyvinyl alcohol, 10 parts of water and 2 parts of 25% ammonia are added and then 46 parts of benzine are emulsified in. The resulting paste may be used for printing and coating fabrics, if desired after the addition of pigment colours. After drying, it is heated for a few minutes above 120° C.

Example 4

A fabric web is impregnated with a 3% solution of the reaction product of 1 mol of oxalic acid diethyl ester and 2 mols of ethylene-imine in water, squeezed between rollers and dried at 70° C. It is then printed with a paste which has been prepared according to Example 2 but without the addition of a di-isocyanate-bisulphite compound, dried and heated for 5 minutes at 120° to 130° C. A print is obtained which is fast to water and rubbing.

Alternatively, the fabric may be first printed, dried and then impregnated with a polyfunctional compound, for example treated with a solution of a di-isocyanate, dried and heated.

Example 5

125 parts of a 40% aqueous dispersion of an interpolymer of 66 parts of acrylic acid ethyl ester, 12 parts of styrene and 22 parts of vinyl isobutyl ether are mixed with 25 parts of a 6% solution of tragacanth in water, 5 parts of glycerine, 3 parts of a 25% aqueous ammonia solution and 12.5 parts of a 20% aqueous solution of the reaction product of 1 mol of octadecyl alcohol and 25 mols of ethylene oxide. 180 parts of lacquer benzine and 50 parts of trichlorethylene are dispersed therein with a rapid stirrer and a flexible binding agent paste is obtained.

5 parts of a finely dispersed aqueous pigment paste having a dyestuff concentration of about 40% and 2 parts of the reaction product of 1 mol of oxalic acid diethyl ester and 2 mols of ethylene-imine are homogeneously dispersed in the said binding agent paste.

The product is printed with a finely-engraved roller on a web of a polyamide, dried and heated for 5 to 10 minutes at 100° to 130° C. A sharply-defined print is obtained which is fast to rubbing and washing.

Alkali or ammonium alginates, partly methylated cellulose and the like may be employed as protective colloids instead of tragacanth.

What I claim is:

1. An oil-in-water emulsion for coating and printing fibrous materials comprising (a) a dispersion of water-insoluble high polymer substance, said high polymer substance yielding flexible films, and having been prepared by the polymerization of olefinically unsaturated monomers (b) a monomeric nitrogen-containing cross-linking agent containing at least two reactive groups, the reactive groups being of the same kind and selected from the class consisting of ethylene imine and isocyanate, and (c) a water-soluble protective colloid having reactive groups capable of reacting with said nitrogen-containing cross-linking agent, the aforesaid high polymer substance being inert to the action of said cross-linking agent, and an organic volatile solvent having a boiling point above 75° C. which is insoluble in water.

2. A heterogeneous printing paste for printing fibrous materials which comprises an oil-in-water emulsion containing pigment colors which comprises (a) a dispersion of water-insoluble high polymer substance, said high polymer substance yielding flexible films, and having been prepared by the polymerization of olefinically unsaturated monomers, (b) a monomeric nitrogen-containing cross-linking agent containing at least two reactive groups, the reactive groups being of the same kind and selected from the class consisting of ethylene imine and isocyanate, and (c) a water-soluble protective colloid having reactive groups capable of reacting with said nitrogen-containing cross-linking agent, the aforesaid high polymer substance being inert to the action of said cross-linking agent, and an organic volatile solvent having a boiling point above 75° C. which is insoluble in water.

3. A heterogeneous printing paste for printing fibrous materials which comprises an oil-in-water emulsion containing pigment colors which comprises (a) a dispersion of water-insoluble high polymer substance, said high polymer substance yielding flexible films and being selected from the group consisting of the polymers and copolymers formed from the group of monomers consisting of acrylic acid esters, styrene, vinylisobutyl ether, vinyl chloride and vinyl propionate, (b) a monomeric nitrogen-containing cross-linking agent containing at least two reactive groups, the reactive groups being of the same kind and selected from the class consisting of ethylene imine and isocyanate, and (c) a water-soluble protective colloid having reactive groups capable of reacting with said nitrogen-containing cross-linking agent, and an organic volatile solvent having a boiling point above 75° C., which is insoluble in water.

4. An oil-in-water emulsion for coating and printing fibrous materials comprising (a) a dispersion of water-insoluble high polymer substance, said high polymer substance yielding flexible films and being selected from the group consisting of the polymers and copolymers formed from the group of monomers consisting of acrylic acid esters, styrene, vinylisobutyl ether, vinyl chloride and vinyl propionate, (b) a monomeric nitrogen-containing cross-linking agent containing at least two reactive groups, the reactive groups being of the same kind and selected from the class consisting of ethylene imine and isocyanate, and (c) a water-insoluble protective colloid having reactive groups capable of reacting with said nitrogen-containing cross-linking agent, and an organic volatile solvent having a boiling point above 75° C. which is insoluble in water.

5. A pigmented oil in water emulsion as claimed in claim 2 wherein a compound selected from the class consisting of casein, ammonium salts of partly saponified polyacrylic acid esters, polyvinyl alcohol, water-insoluble alginates, tragacanth and partly methylated cellulose is used as protective colloid.

6. A pigmented oil in water emulsion as claimed in claim 2 the organic water-insoluble volatile solvent having a boiling point above 75° C. is selected from the class consisting of gasoline, benzene, toluene, xylene, and trichlorethylene.

7. A pigmented oil in water emulsion as claimed in claim 2 wherein as cross-linking agent are used compounds yielding a polyisocyanate by heating.

8. A pigmented oil in water emulsion as claimed in claim 7 wherein the adduct of hexamethylene diisocyanate and sodium bisulfite is used as cross-linking agent.

9. A pigmented oil-in-water emulsion as claimed in claim 2 wherein the cross-linking agent is:

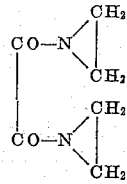

10. A pigmented oil-in-water emulsion as claimed in claim 2 wherein the cross-linking agent is:

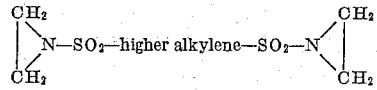

References Cited in the file of this patent

UNITED STATES PATENTS

| | | |
|---|---|---|
| 2,275,991 | Powers | Mar. 10, 1942 |
| 2,333,917 | Christ et al. | Nov. 9, 1943 |
| 2,374,602 | Kienle et al. | Apr. 24, 1945 |
| 2,430,479 | Pratt et al. | Nov. 11, 1947 |
| 2,468,713 | Kropa et al. | Apr. 26, 1949 |
| 2,468,716 | Nyquist et al. | Apr. 26, 1949 |
| 2,558,053 | Lee | June 26, 1951 |
| 2,643,958 | Kleiner et al. | June 30, 1953 |

OTHER REFERENCES

"German Plastics Practice," published by De Bell & Richardson in 1945, pages 128–129.

Ser. No. 418,067, Durr (A. P. C.), published June 8, 1943.